United States Patent [19]
Cole

[11] Patent Number: 5,433,586
[45] Date of Patent: * Jul. 18, 1995

[54] TAPERED PROPELLER BLADE DESIGN

[75] Inventor: Gregory M. Cole, Prairie du Sac, Wis.

[73] Assignee: Cessna Aircraft Company, Wichita, Kans.

[ * ] Notice: The portion of the term of this patent subsequent to May 11, 2010 has been disclaimed.

[21] Appl. No.: 57,343

[22] Filed: May 3, 1993

Related U.S. Application Data

[63] Continuation-in-part of Ser. No. 677,626, Mar. 27, 1991, Pat. No. 5,209,643.

[51] Int. Cl.$^6$ ............................................... B63H 1/26
[52] U.S. Cl. .................. 416/223 R; 416/228; 416/238; 416/DIG. 5
[58] Field of Search ............ 416/223 R, 228, 238, 416/DIG. 2, DIG. 5

[56] References Cited

U.S. PATENT DOCUMENTS

| | | | |
|---|---|---|---|
| 1,471,590 | 10/1923 | Carter | 416/223 |
| 2,023,684 | 12/1935 | Hubbell | 416/DIG. 2 |
| 4,047,841 | 9/1977 | Laurin | 416/223 R |
| 4,171,183 | 10/1979 | Cornell et al. | 416/223 R |
| 4,370,097 | 1/1983 | Hanson et al. | 416/223 R |
| 4,519,746 | 5/1985 | Wainauski et al. | 416/223 R |
| 4,668,169 | 5/1987 | Perry | 416/223 R |
| 4,730,985 | 3/1988 | Rothman et al. | 416/228 |
| 4,830,574 | 5/1989 | Wainanski et al. | 416/223 R |
| 4,834,617 | 5/1989 | Wainanski et al. | 416/DIG. 2 |
| 4,941,803 | 7/1990 | Wainanski et al. | 416/DIG. 2 |
| 4,969,800 | 11/1990 | Parry et al. | 416/238 |
| 5,209,643 | 5/1993 | Cole | 416/223 R X |

Primary Examiner—Edward K. Look
Assistant Examiner—Michael S. Lee
Attorney, Agent, or Firm—Edward L. Brown, Jr.

[57] ABSTRACT

An aircraft variable pitch propeller blade utilized in subsonic flight at relatively slow turning applications with relatively high power coefficients. The blade in plan form is tapered at both ends with the maximum chord approximate the mid station of the blade, the leading edge of the blade being swept behind the longitudinal axis of the blade near its tip and the trailing edge is convex and essentially straight from its maximum chord outward to the tip.

8 Claims, 9 Drawing Sheets

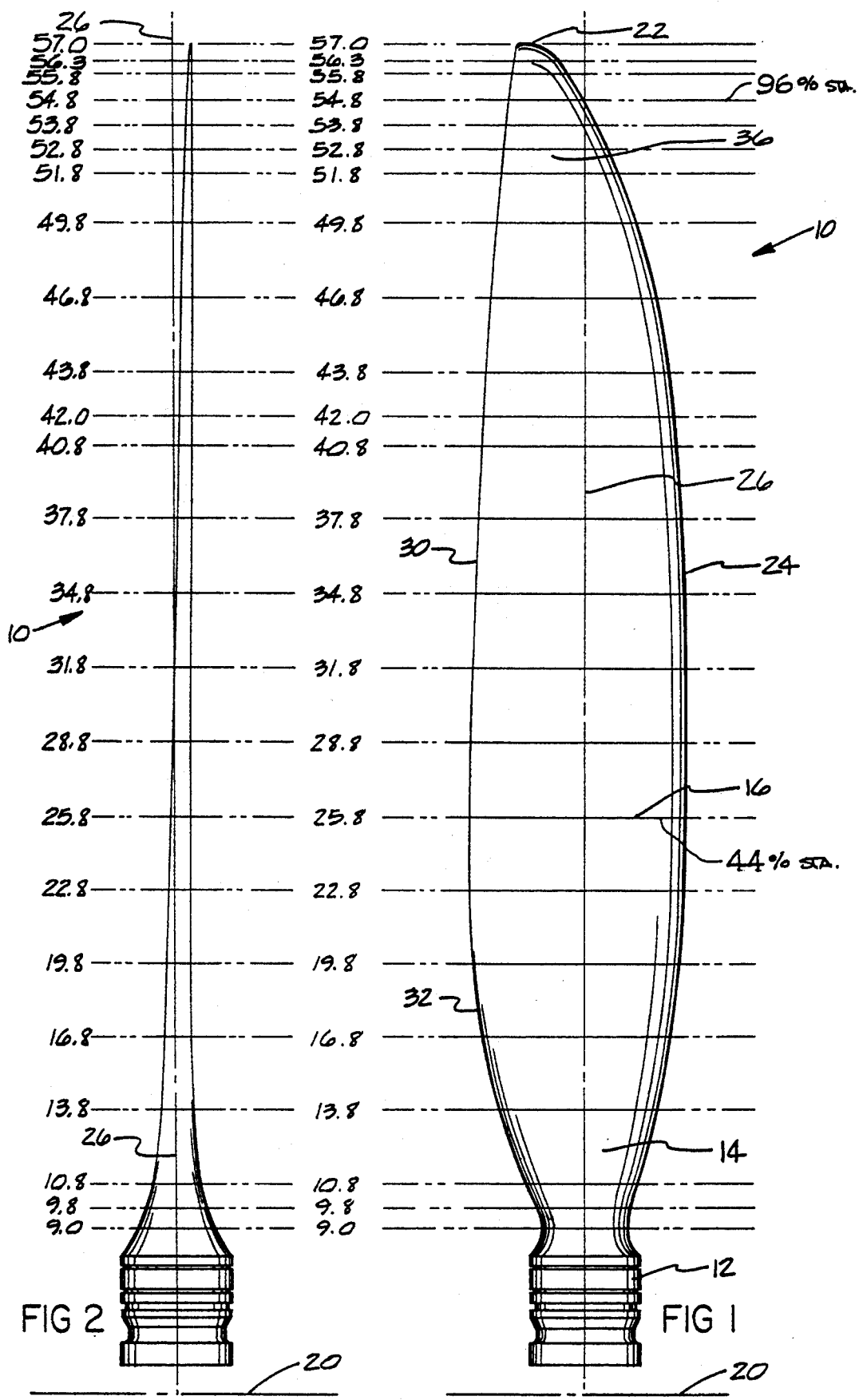

9.0

10.8

13.8

16.8

19.8

22.8

25.8

28.8

31.8

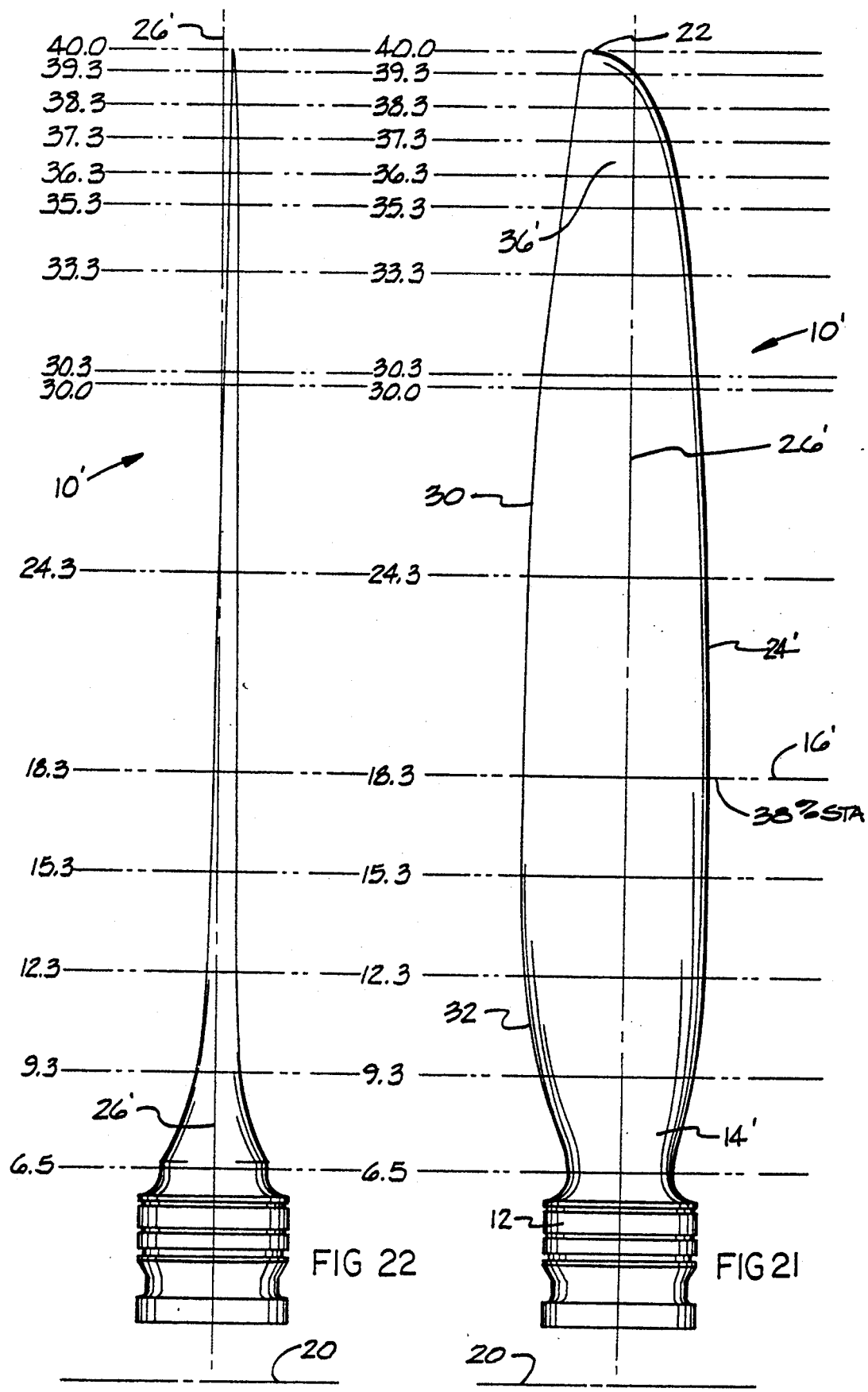

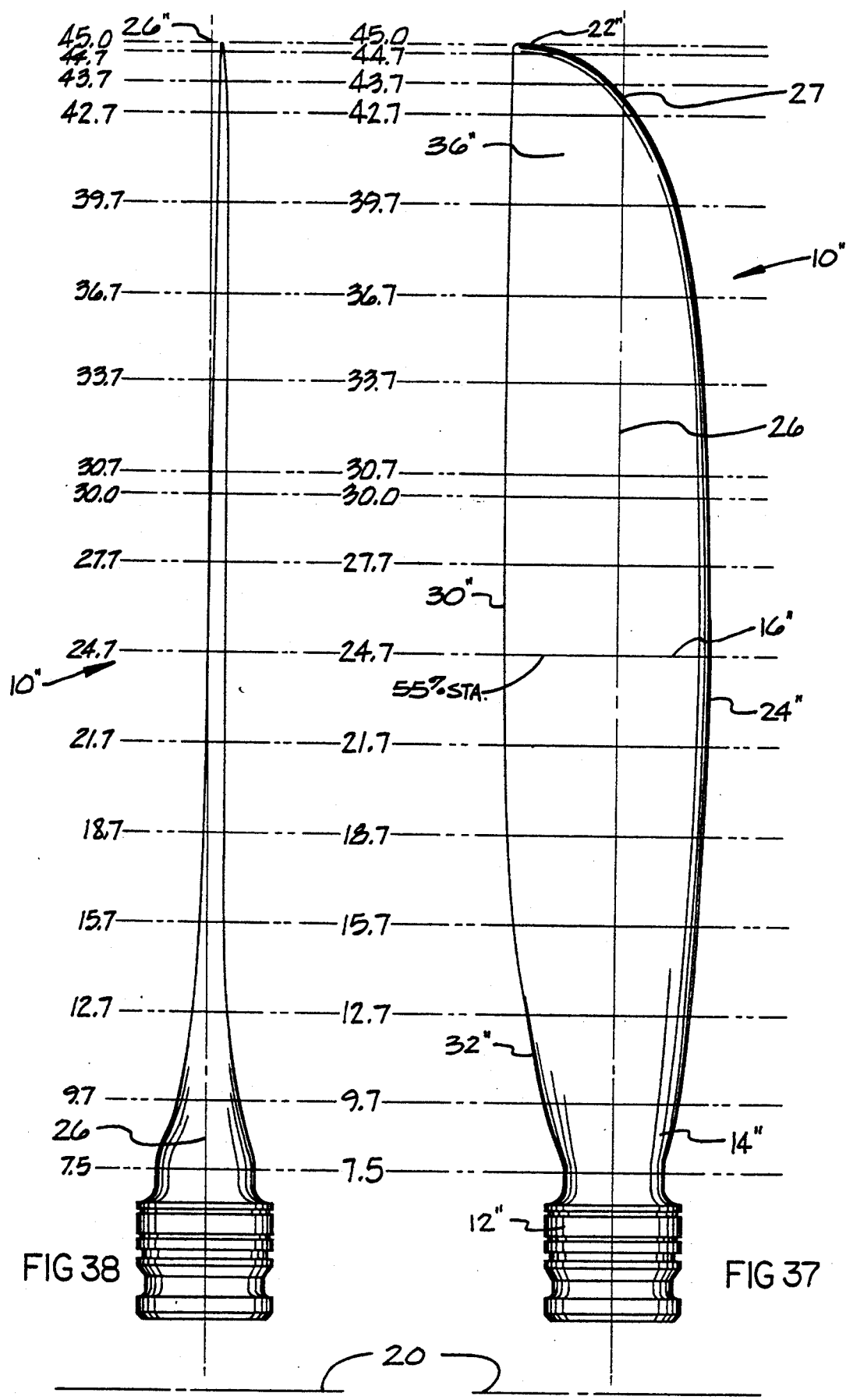

30.7

26"

33.7

36.7

26"

39.7

42.7

26"

43.7

26"  44.7

TAPERED PROPELLER BLADE DESIGN

This is a continuation-in-part application of prior patent application Ser. No. 07/677,626 filed Mar. 27, 1991, now U.S. Pat. No. 5,209,643 entitled TAPERED PROPELLER BLADE DESIGN, the inventor being Gregory M. Cole.

BACKGROUND OF THE INVENTION

This invention relates to aircraft propellers and more specifically to slow turning turbine application with relatively high power coefficients. These applications are very weight and polar moment sensitive and the aircraft require high levels of performance with low noise and vibration levels for passenger comfort. The propellers for these aircraft must turn at relatively low speeds so as to keep the tip velocities subsonic at their high cruise speeds. The new blade design of the present invention is particularly effective in meeting these performance requirements.

DESCRIPTION OF THE PRIOR ART

The concept of sweeping the leading edge of propeller blades goes back to the early years of powered flight wherein the early laminated wood blades were constructed with leading edge sweep for reasons not scientifically known.

In the patent to Mattson U.S. Pat. No. 2,306,177, the concept of leading edge sweep is taught along with a straight trailing edge; however, the trailing edge is inclined away from the longitudinal axis of the blade causing the blade chord to increase through major portions of the blade which is contrary to the prevent invention.

In recent times, with the advent of the prop fan powered commercial aircraft, the need for low tip speeds in relatively high flight speeds arose. Designers increased the number of blades, shortened their lengths and swept their leading edges so as to stay below their critical Mach numbers. Examples of these prop fans' designs are illustrated in the U.S. Pat. Nos. to Cornell 4,171,183; Hanson 4,370,097; Wainauski 4,834,617; and Parry 4,969,800. While all of the prop fan patents just mentioned include leading edge sweep, they also involve supersonic tip speeds and composite blade designs which are otherwise substantially different from the subsonic application of the present invention.

SUMMARY OF THE INVENTION

The blade design of the present invention provides an improved performance design with reduced noise, weights, polar moments of inertia, and increased torsional stiffness over conventional constant chord designs. This is accomplished by tapering the plan form of the blade from the mid-station of the blade outward to the tip with the leading edge of the blade being swept back while the trailing edge is nearly straight or slightly convex. The maximum chord of the blade is reached at a radial station approximate its mid-station from the rotational axis of the propeller to the tip. From the maximum chord station to the tip, the leading edge is progressively swept back with the leading edge crossing the longitudinal axis of the blade approximate the tip. Inboard from the maximum chord, the chord remains nearly constant except for the transitional region between the blade and the shank where the chord rapidly decreases to blend into the cylindrical shank. The inboard blade thickness of the present design is thinner than might be expected as compared with the standard constant chord propeller blades of the same power range. The resulting thickness ratio at those inboard stations are significantly lower than conventional designs.

It is, therefore, the principal object of the present invention to provide a propeller blade design with improved performances in the areas of aerodynamics, weight, and acoustics.

Another object of the present invention is to provide a blade design which increases the torsional stiffness 50% over a constant chord design.

A further object of the present invention is a blade having a tapered chord distribution based on the Betz loading.

Another object of the present invention is to provide a blade design with a tapered chord distribution such that the trailing edge of the blade is straight or slightly convex to reduce the steady strain due to centrifugal loading.

Another object of the present invention is a blade design that under deflection provides wash-out rather than wash-in.

Other objects and advantages will be apparent from the specification and claims and from the accompanying drawings which illustrate an embodiment of the invention.

BRIEF DESCRIPTION OF THE DRAWINGS

FIG. 1 is a plan view of one of the blades with the twist removed with a series of cross-sectional stations;

FIG. 2 is a side elevation of the blade with the same series of cross-sectional stations;

FIG. 21 is a plan view of a slightly modified blade with the twist removed including a series of cross-sectional stations positioned along its length;

FIG. 22 is a side elevational view of the blade of FIG. 21 with the same series of cross-sectional stations;

FIG. 37 is a plan view of a further modified blade with the twist removed including a series of cross-sectional stations located along the length of the blade;

FIG. 38 is a side elevational view of the blade of FIG. 37 with the same series of cross-sectional stations as shown thereon.

BEST MODE FOR CARRYING OUT THE INVENTION

Figure 3:
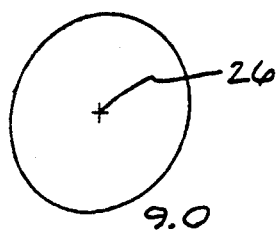
FIGS. 3 through 20 are a series of cross-sectional views of the airfoil sections taken at stations indicated in FIGS. 1 and 2.
Figure 4:
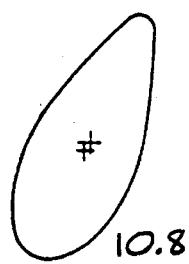
Figure 5:
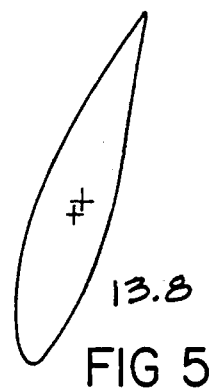
Figure 6:
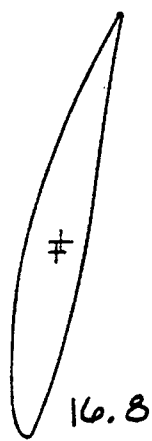
Figure 7:
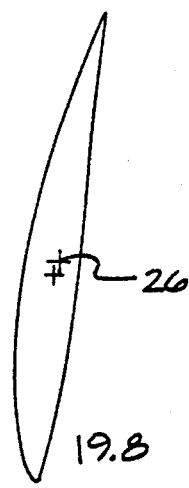
Figure 8:
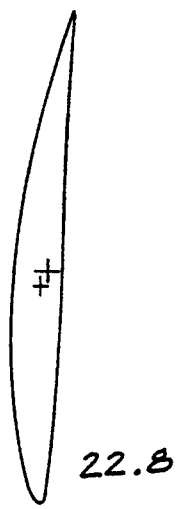
Figure 9:
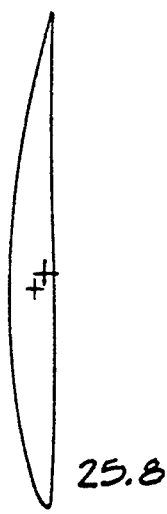
Figure 10:
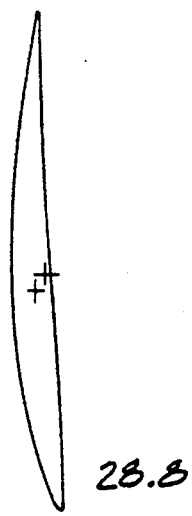
Figure 11:
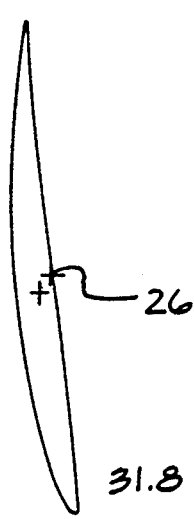
Figure 12:
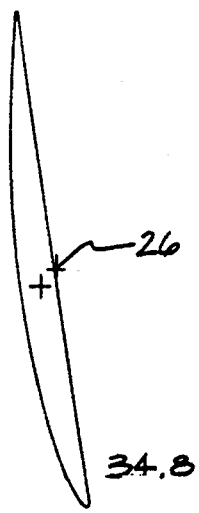
Figure 13:
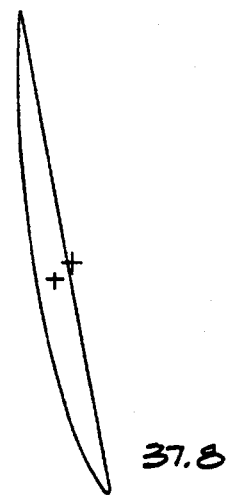
Figure 14:
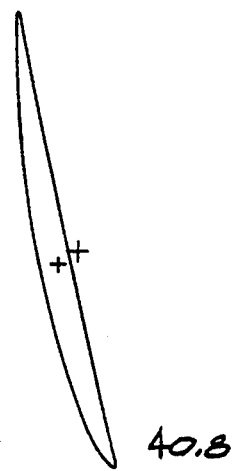
Figure 15:
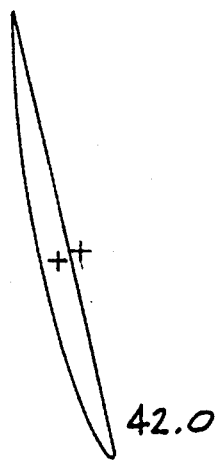
Figure 16:
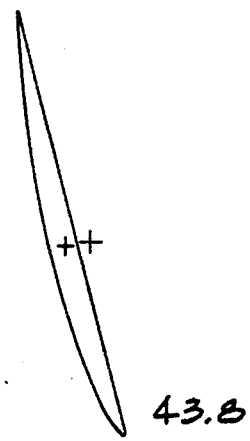
Figure 17:
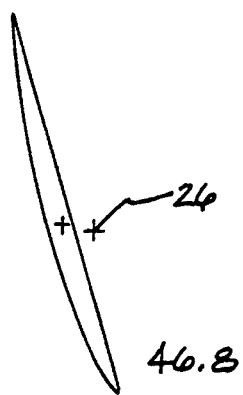
Figure 18:
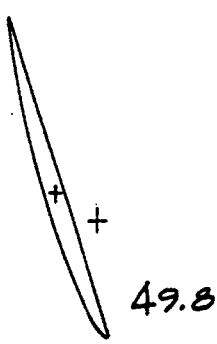
Figure 19:
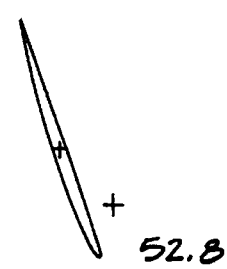
Figure 20:
Figure 23:
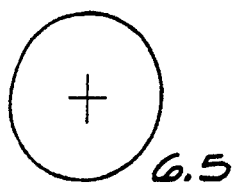
FIGS. 23 through 36 are a series of cross-sectional views of the airfoil sections taken at the stations indicated in FIGS. 21 and 22.
Figure 24:
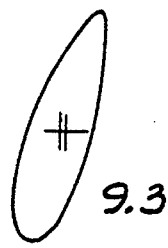
Figure 25:
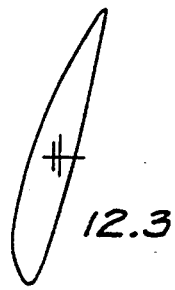
Figure 26:
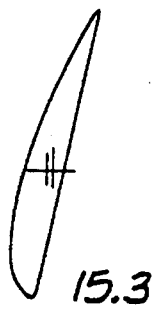
Figure 27:
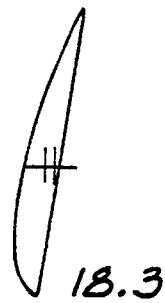
Figure 28:
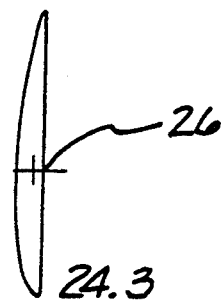
Figure 29:
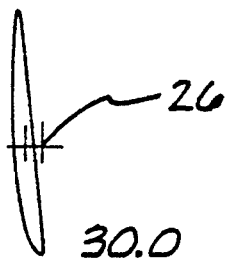
Figure 30:
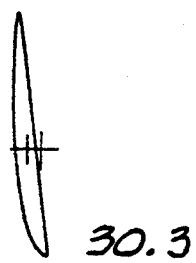
Figure 31:
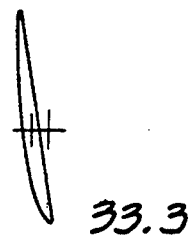
Figure 32:
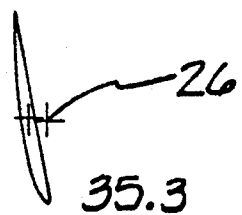
Figure 33:
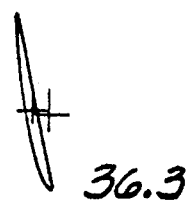
Figure 34:
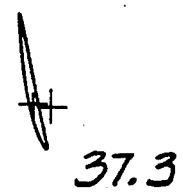
Figure 35:
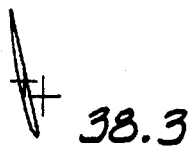
Figure 36:
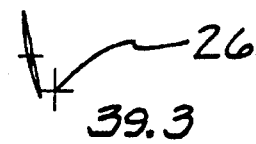
Figure 39:
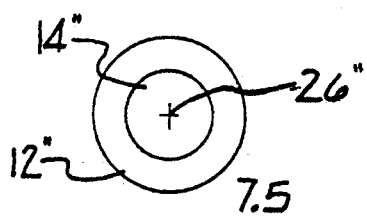
FIG. 39 through 54 are a series of cross-sectional views of the airfoil sections taken at the stations indicated in FIGS. 37 and 38.
Figure 40:
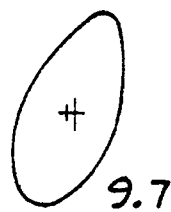
Figure 41:
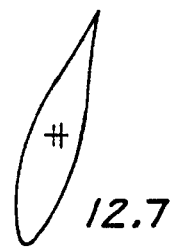
Figure 42:
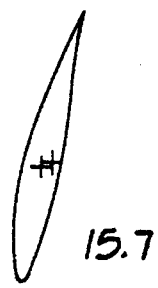
Figure 43:
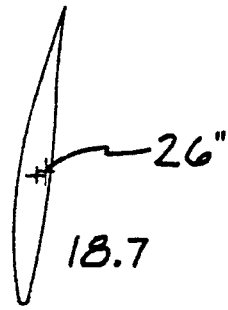
Figure 44:
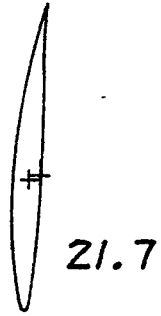

Referring to FIG. 1, the propeller blade of the present invention is generally described by reference numeral 10. The blade 10 forged from an aluminum alloy, includes a cylindrical shank 12 which connects to the blade through a blade-shank transition region 14 with the chord of the blade increasing to its maximum chord 16 which is approximate the radial station 25.8 (inches) which is measured from the rotational axis 20 of the propeller. The maximum chord is also shown in section in FIG. 9. The leading edge of the blade 24 is swept progressively greater towards tip 22 and crosses the longitudinal rotation axis 26 of the blade at the 54.8 station which is also referred to as the 96% blade radius station. The percent radius station is calculated by taking the actual station number and dividing it by 57.0 the station at the tip 11 of the blade. Inboard of the maximum chord 16, the chord remains nearly constant except for the transition region 14 wherein the chord rapidly decreases to blend into the cylindrical shank 12. Shank 12 includes circumferential ball bearing and seal grooves 11 and 13, respectively, which are retained in a well-known conventional hub structure not shown in the drawings. The blade chord distribution outboard of the maximum chord 16 is distributed such that the trailing edge of the blade 30 forms a nearly straight line. The inboard portion 32 of the trailing edge from the maximum chord station is slightly convex. While the actual blades include twist, they are shown in FIGS. 1, 2, 21, 22, 37 and 38 with the twist removed for purposes of viewing the full chord.

FIGS. 3 through 20 are a series of airfoil sections along the blade at the various stations indicated in FIGS. 1 and 2. These figures illustrate the changing airfoil sections and degree of twist along the full length of the blade. The thickness of the inboard sections of the blades between station 13.8 and 22.8 are thinner than conventional blade designs of the same power range. The resulting thickness ratios (thickness of the blade divided by chord) are therefore significantly lower in the above-mentioned inboard regions. The blade design of the present invention utilizes a more constant level of camber along the blade than typically seen in other constant chord propeller designs.

FIGS. 21 through 36 illustrate a modified blade design of the present invention which is 40 inches in length from its rotational axis 20. The maximum chord 16' of this design is located approximate the radial station 18.0 (inches) which is also referred to as the 38% blade radius station. The leading edge 24' is swept progressively towards the tip 22' and crosses the longitudinal axis 26' of the blade at the 39.0 station. FIGS. 22 through 36 illustrate the cross sectional views of the airfoil sections taken at the same numbered stations indicated in FIGS. 21 and 22.

Figure 45:
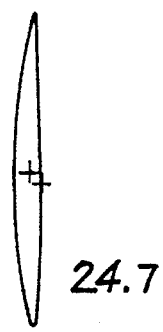
Figure 46:
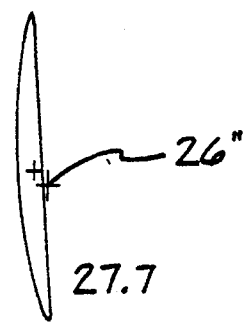
Figure 47:
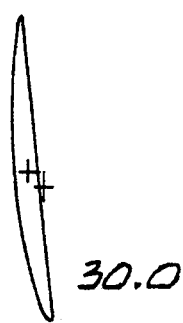
Figure 48:
Figure 49:
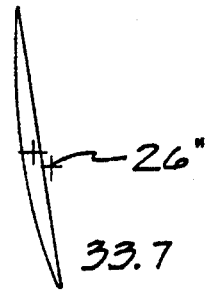
Figure 50:
Figure 51:
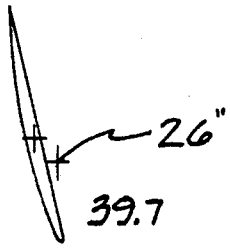
Figure 52:
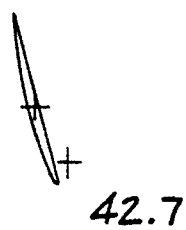
Figure 53:
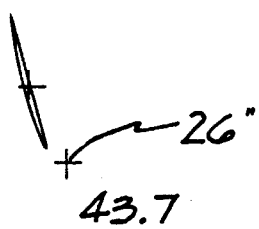
Figure 54:
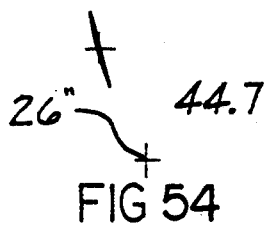

FIGS. 37 through 54 illustrate another slightly modified blade design of the present invention which has a blade length of 45 inches from its rotational axis 20. The maximum chord 16" is shown in section in FIG. 45 which is approximate the radial station 24.7 (inches) which is also referred to as the 55% blade radius station. The leading edge 24" is swept progressively greater towards the tip 22' and crosses the longitudinal rotational axis 26" of the blade at 27 between the 42.7 and the 43.7 station. Inboard of the maximum chord 16" the chord remains nearly constant except for the transition region 14" when the chord rapidly decreases to blend into the cylindrical shank 12". The blade chord distribution outboard of the maximum chord 16" is distributed such that the trailing edge of the blade 30" forms a nearly straight line. The inboard section 32" of the trailing edge from the maximum chord is slightly convex. FIGS. 39 through 54 are a series of airfoil sections along the blade at the various stations indicated in FIGS. 37 and 38.

To produce a maximum thrust for a given power input, the profile and induced drag losses must be minimized. The profile losses are a function of airfoil section design and operating state as well as wetted area. The present design reduces profile losses by a reduction of wetted area in the high dynamic pressure outboard regions 36 approximate the blade tip. The form drag losses are minimized by the relatively thin inboard blade sections mentioned above. With less separation on those inboard sections, there is not only less drag but less disturbance to engine breathing and ram recovery which in turn reflects on available engine power. The blade design maintains a low-induced loss loading distribution compared with conventional blade designs in conditions of high power inputs at low speeds or low power inputs at high speeds due to its Betz loading. Betz loading is achieved and maintained in the off design conditions by constant angle of attack, constant camber and tapered chords. The maintenance of this loading will also help reduce propeller noise. This is particularly apparent when a propeller becomes tip-loaded which is a condition which occurs at high power configurations and the noise produced by such configurations increases dramatically. The sweep of the leading edge approximate the tip reduces induced drag by favorable placement of the trailing vortex in the wake of the tip rather than inboard from the tip as in constant chord designs. The sweep and chord distribution also reduce noise through source phase cancellation. The phase cancellation created by blade sweep would decrease noise since the total noise would be a linear summation of all sources with respective phase angles applied.

Another benefit of blade sweep is that it will increase the airfoil section critical Mach number.

The blade sweep also changes the blade twist with deflection to that of wash-out or reduced wash-in as compared with a typical blade design.

The tapered plan form of the present blade design reduced once per revolution changes in 1-XP loading due to non-axial inflow thus allowing thinner inboard sections. The tapered plan form also reduces mass in the outboard region 36 of the blade which contributes to lower centrifugal loading that must also be reacted by the inboard sections. The present blade design is now able to utilize lower cross-sectional inboard stations by reason of the above-mentioned reduced loadings. The reduction in blade tip mass along with the inboard mass reduction allows the blade to realize significant weight savings and polar moment reduction as compared with conventional blade.

The aerodynamic performance of the present blade design by virtue of the unique swept leading edge and chord distribution as well as the thinner inboard sections provides improved aerodynamic performance at less weight along with improved acoustical performance.

It should be understood that invention is not limited to the particular embodiments shown and described herein, but that various changes and modifications may be made without departing from the spirit and scope of the novel concept as defined by the following claims.

I claim:

1. An aerial variable pitch propeller blade utilized in subsonic flight regions comprising:

a blade having leading and trailing edges, a tip, a cylinder shank having a rotational longitudinal axis, and a transition area between the shank and the blade, in plan form the blade is tapered from both ends with a maximum chord substantially in a range between 38% and 55% of the blade radius stations, the leading edge of the blade being swept behind the rotational longitudinal axis of the blade and the trailing edge is convex and substantially straight from its maximum chord outward to the tip.

2. An aerial propeller blade as set forth in claim 1, wherein the trailing edge from the maximum chord outward is inclined toward the longitudinal axis of the blade.

3. An aerial propeller blade as set forth in claim 1, wherein the trailing edge from the maximum chord outward is substantially parallel with the longitudinal axis of the blade.

4. An aerial propeller blade as set forth in claim 1, wherein the trailing edge of the blade from the maximum chord inbound is convex in shape.

5. An aerial propeller blade as set forth in claim 1, wherein the taper of the blade is progressively greater towards the tip with the leading edge intersecting the blade longitudinal axis at substantially the 96% blade radius station.

6. An aerial variable pitch propeller blade utilized in subsonic flight regions comprising:
a blade having leading and trailing edges, a tip, a cylinder shank having a rotational longitudinal axis, and a transition area between the shank and the blade, in plan form the blade is tapered from both ends with a maximum chord substantially at the 38% blade radius station, the leading edge of the blade being swept behind the rotational longitudinal axis of the blade and the trailing edge is convex and substantially straight from its maximum chord outward to the tip.

7. An aerial propeller as set forth in claim 6, wherein the trailing edge from the maximum chord outward is inclined toward the longitudinal axis of the blade.

8. An aerial variable pitch propeller blade utilized in subsonic flight regions comprising:
a blade having leading and trailing edges, a tip, a cylinder shank having a rotational longitudinal axis, and a transition area between the shank and the blade, in plan form the blade is tapered from both ends with a maximum chord substantially at the 55% blade radius station, the leading edge of the blade being swept behind the rotational longitudinal axis of the blade and the trailing edge is convex and substantially straight from its maximum chord outward to the tip.

* * * * *